United States Patent
Campbell et al.

(10) Patent No.: US 7,267,297 B2
(45) Date of Patent: Sep. 11, 2007

(54) INTEGRATED AXIALLY VARYING ENGINE MUFFLER, AND ASSOCIATED METHODS AND SYSTEMS

(75) Inventors: Thomas A. Campbell, Seattle, WA (US); William A. Voll, Seattle, WA (US); John A. Diamond, Seattle, WA (US)

(73) Assignee: The Boeing Company, Chicago, IL (US)

( * ) Notice: Subject to any disclaimer, the term of this patent is extended or adjusted under 35 U.S.C. 154(b) by 435 days.

(21) Appl. No.: 10/934,065

(22) Filed: Sep. 2, 2004

(65) Prior Publication Data

US 2006/0043236 A1    Mar. 2, 2006

(51) Int. Cl.
B64D 33/04    (2006.01)

(52) U.S. Cl. .................. 244/1 N; 244/53 R; 60/725; 181/222

(58) Field of Classification Search ............... 244/1 N, 244/53 R, 58; 181/219, 222, 228, 252; 60/725
See application file for complete search history.

(56) References Cited

U.S. PATENT DOCUMENTS

| | | | |
|---|---|---|---|
| 2,016,253 | A | 10/1935 | Noblitt et al. |
| 2,512,155 | A | 6/1950 | Hill |
| 2,988,302 | A | 6/1961 | Smith |
| 3,033,307 | A | 5/1962 | Sanders et al. |
| 3,353,626 | A | 11/1967 | Cremer et al. |
| 3,437,173 | A | 4/1969 | Ehrich |
| 3,439,774 | A | 4/1969 | Callaway et al. |
| 3,519,843 | A | 7/1970 | Trautman |
| 3,648,803 | A | 3/1972 | Heath et al. |
| 3,680,660 | A | 8/1972 | Dubois |
| 3,764,815 | A | 10/1973 | Habock et al. |

(Continued)

FOREIGN PATENT DOCUMENTS

CA    2261730    2/1998

(Continued)

OTHER PUBLICATIONS

Henri Coanda, mhtml:file://C:\TEMP\Henri%20Coanda.mht, pp. 1-3 [Accessed May 28, 2004].

(Continued)

*Primary Examiner*—Rob Swiatek
(74) *Attorney, Agent, or Firm*—Perkins Coie LLP (57) ABSTRACT

Integrated axially varying engine mufflers, and associated methods and systems. An arrangement in accordance with one embodiment of the invention includes a tailcone having a tapering external surface, a cavity disposed within the surface, and an engine muffler disposed within the cavity. The engine muffler can have a tapering outer surface, a porous inner surface disposed inwardly from the outer surface, and a plurality of cells disposed between the outer surface and the inner surface in fluid communication with the perforations of the inner surface. The inner surface can be positioned adjacent to an exhaust gas flow path having an entrance aperture and an exit aperture. Cells positioned toward the entrance aperture can have a first dimension extending away from the gas path, and cells positioned toward the exit aperture can have a second, different, dimension extending away from the exhaust gas path. Accordingly, the tapered muffler can be integrated with the tapered tailcone, and can provide sounds attenuation over a range of frequencies.

26 Claims, 4 Drawing Sheets

U.S. PATENT DOCUMENTS

| | | |
|---|---|---|
| 3,913,702 A | 10/1975 | Wirt et al. |
| 3,920,095 A | 11/1975 | Clark |
| 4,001,892 A | 1/1977 | Castelli et al. |
| 4,064,961 A | 12/1977 | Tseo |
| 4,091,892 A | 5/1978 | Hehmann et al. |
| 4,137,992 A | 2/1979 | Herman |
| 4,226,297 A | 10/1980 | Cicon |
| 4,244,441 A | 1/1981 | Tolman |
| 4,314,621 A | 2/1982 | Hansen |
| 4,359,136 A | 11/1982 | Eriksson |
| 4,360,075 A | 11/1982 | Blaser et al. |
| 4,371,053 A | 2/1983 | Jones |
| 4,456,830 A | 6/1984 | Cronin |
| 4,645,032 A | 2/1987 | Ross et al. |
| 4,744,440 A | 5/1988 | Hanson |
| 4,979,587 A | 12/1990 | Hirt et al. |
| 5,162,620 A | 11/1992 | Ross et al. |
| 5,268,541 A | 12/1993 | Pettersson |
| 5,365,025 A | 11/1994 | Kraai et al. |
| 5,655,359 A | 8/1997 | Campbell et al. |
| 5,902,970 A | 5/1999 | Ferri |
| 6,018,233 A | 1/2000 | Glennon |
| 6,039,287 A | 3/2000 | Liston et al. |
| 6,092,360 A | 7/2000 | Hoag et al. |
| 6,158,546 A | 12/2000 | Hanson et al. |
| 6,244,539 B1 | 6/2001 | Liston et al. |
| 6,308,915 B1 | 10/2001 | Liston et al. |
| 6,360,844 B2 | 3/2002 | Hogeboom et al. |
| 6,508,219 B2 | 1/2003 | Schorn |
| 6,615,576 B2 | 9/2003 | Sheoran et al. |
| 6,651,929 B2 | 11/2003 | Dionne |
| 6,695,094 B2 | 2/2004 | Moffat et al. |
| 6,899,198 B2 * | 5/2005 | Zindl et al. ............ 181/222 |
| 6,935,834 B2 * | 8/2005 | Lata Perez ............ 415/115 |
| 2002/0134614 A1 * | 9/2002 | Chen ............ 181/252 |
| 2002/0139120 A1 | 10/2002 | Sheoran et al. |
| 2006/0071123 A1 | 4/2006 | Nguyen |
| 2006/0102779 A1 | 5/2006 | Campbell |
| 2006/0168968 A1 | 8/2006 | Zielinski |

FOREIGN PATENT DOCUMENTS

| | | |
|---|---|---|
| DE | 69712210 | 10/2002 |
| DE | 69712797 | 11/2002 |
| EP | 1010618 A2 | 6/2000 |
| EP | 1010618 A3 | 6/2000 |
| EP | 0923488 | 4/2002 |
| EP | 1010618 B1 | 5/2002 |
| JP | 57-113919 | 7/1982 |
| JP | 05-163925 | 6/1993 |
| JP | 2000516553 | 12/2000 |
| WO | WO-9805553 | 2/1998 |

OTHER PUBLICATIONS

Michael Andretti Powersports, "Titanium Oval Muffler," mhtml:file://C:\TEMP\OVAL%20MUFFLER%20step%20increases.mht, pp. 1-2 [May 28, 2004].

PCT International Search Report and Written Opinion for PCT/US2005/031484; Applicant: The Boeing Company: European Patent Office; dated Dec. 12, 2005.

* cited by examiner

INTEGRATED AXIALLY VARYING ENGINE MUFFLER, AND ASSOCIATED METHODS AND SYSTEMS

TECHNICAL FIELD

The present invention relates generally to methods and systems for attenuating noise from aircraft engines, including a muffler having an acoustic core with a depth that varies axially to attenuate noise from an auxiliary power unit.

BACKGROUND

Existing commercial transport jet aircraft typically include two or more primary turbine engines for propulsion. These aircraft also typically include at least one auxiliary power unit (APU) that provides power in addition to or in lieu of the power provided by the primary engines. Accordingly, APUs can be used to provide power to the aircraft when the primary engines are not running, for example, while the aircraft is waiting at an airport gate. The APUs can also provide temporary power to start the primary engines during normal operations, and/or temporary emergency power during an engine-out condition or other emergency condition.

Over the course of time, aircraft manufacturers and airlines have come under increasing pressure to reduce the noise emitted by aircraft during normal operations, including gate operations, taxi, takeoff, and landing. Accordingly, aircraft manufacturers have developed mufflers and other sound attenuating devices to reduce the noise emitted by both the aircraft primary engines and the APUs. One drawback associated with APU mufflers is that they can add a significant amount of weight to the aircraft, necessitating an increase in aircraft structural capabilities and reducing overall aircraft performance. In particular, long mufflers may provide adequate noise attenuation, but may unacceptably reduce overall aircraft performance because they increase the aircraft weight and drag without increasing payload capacity. Short mufflers, while having less of an adverse impact on the aircraft performance, may not comply with guidelines and standards that have been driving acceptable aircraft noise levels downward. Aircraft designers are accordingly confronted with conflicting demands by airlines that include requests for increased aircraft performance on the one hand, and requests for reduced aircraft noise on the other.

SUMMARY

Aspects of the invention are directed generally toward methods and systems for reducing aircraft noise emanations. An aircraft assembly in accordance with one aspect of the invention includes a tailcone having a tapering external surface disposed around a cavity. An engine muffler can be disposed in the cavity and can include a tapering outer surface disposed inwardly from the external surface of the tailcone. The engine muffler can further include a porous inner surface disposed inwardly from the outer surface. The inner surface can be positioned adjacent to an exhaust gas flow path having an entrance aperture configured to be coupled to an engine (e.g., an APU), and an exit aperture positioned at least proximate to the opening of the cavity. A plurality of cells can be disposed between the outer surface and the inner surface and can be in fluid communication with openings of the inner surface. Cells positioned toward the entrance aperture can have a first dimension extending away from the exhaust gas path, and cells positioned toward the exit aperture can have a second dimension extending away from the exhaust gas path, with the second dimension being different than the first dimension. In particular aspects of the invention, the second dimension can be less than the first dimension. Accordingly, the muffler can taper in the same direction as the tailcone. As a result, the muffler can be more easily integrated with the tailcone than can existing mufflers, and the varying depth of the cells in the muffler can attenuate noise over a range of frequencies.

A method in accordance with another aspect of the invention is directed toward sizing an aircraft tailcone and muffler assembly. The method can include determining a length of, and taper angle for, an external surface of an aircraft tailcone based on predicted aerodynamic performance characteristics. The method can further include locating an exit aperture for the tailcone, and identifying a position within the tailcone for an exhaust aperture of an auxiliary power unit. The method can still further include sizing a tapered muffler to fit within the tailcone between the exhaust aperture and the exit aperture without increasing the length of the tailcone. The tapered muffler can have a porous inner surface adjacent to a gas flow path. In a particular aspect of the invention, the method can further include sizing cells of an acoustic core positioned adjacent to the porous surface to have a first dimension generally normal to the gas path proximate to the exhaust aperture, and a second dimension different than the first dimension (e.g., smaller) generally normal to the gas flow path proximate to the exit aperture.

DETAILED DESCRIPTION

The present invention is directed generally toward systems and methods for attenuating noise produced by aircraft. In particular embodiments, the methods and systems are directed toward attenuating the noise produced by aircraft auxiliary power units (APUs). Several embodiments of systems and methods for attenuating aircraft engine noise are described below. A person skilled in the relevant art will understand, however, that the invention may have additional embodiments, and that the invention may be practiced without several of the details of the embodiments described below with reference to FIGS. 1-6.

Figure 1:
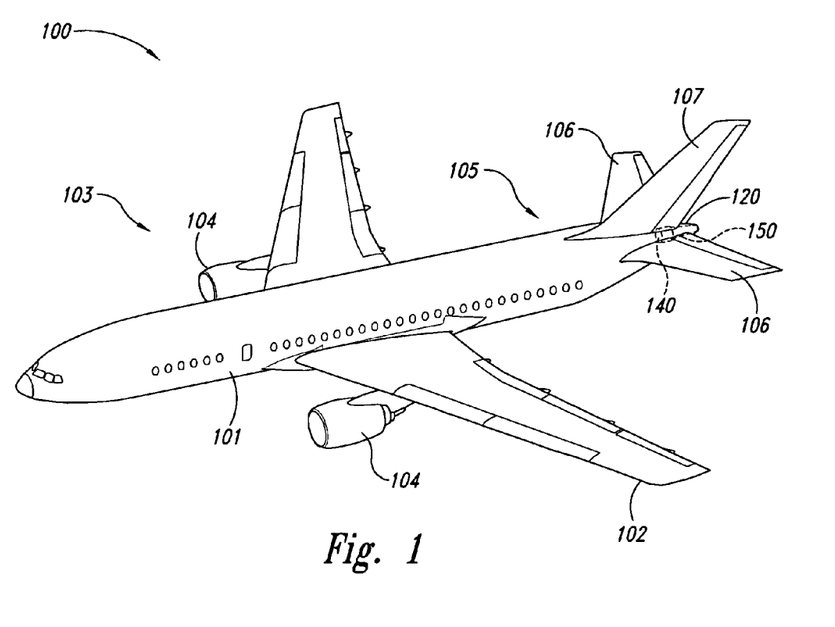
FIG. 1 is a partially schematic, isometric illustration of an aircraft having a tailcone that houses an APU in accordance with an embodiment of the invention.

FIG. 1 is a partially schematic, isometric illustration of an aircraft 100 having a tailcone 120 that houses an APU 140 and an associated muffler 150 arranged in accordance with an embodiment of the invention. The tailcone 120 can be attached to or form a portion of an empennage 105 of the aircraft 100, which can in turn be attached to and/or form a portion of a fuselage 101. The empennage 105 can include a pair of horizontal stabilizers 106 and a vertical stabilizer 107 to control the lateral and vertical motion of the aircraft 100. The aircraft 100 can also include a primary propulsion system 103 having two or more engines 104. In a particular embodiment, the engines 104 can be carried by the wings 102 of the aircraft 100. In other embodiments, the engines 104 can be carried by other portions of the aircraft, e.g., the fuselage 101.

In any of the foregoing embodiments, the arrangement of the tailcone 120, the APU 140, and the associated muffler 150 can be configured to reduce aircraft noise while also having a reduced and/or negligible impact on aircraft performance. Accordingly, the aircraft 100 can be quieter during operational phases when the APU 140 causes a significant portion of the overall aircraft noise (e.g., while the aircraft is on an airport ramp). At the same time, the performance penalty for reducing the noise can be mitigated and/or eliminated when compared with existing approaches to addressing noise attenuation. Further details of methods and systems in accordance with embodiments of the invention are described below with reference to FIGS. 2-6.

Figure 2:
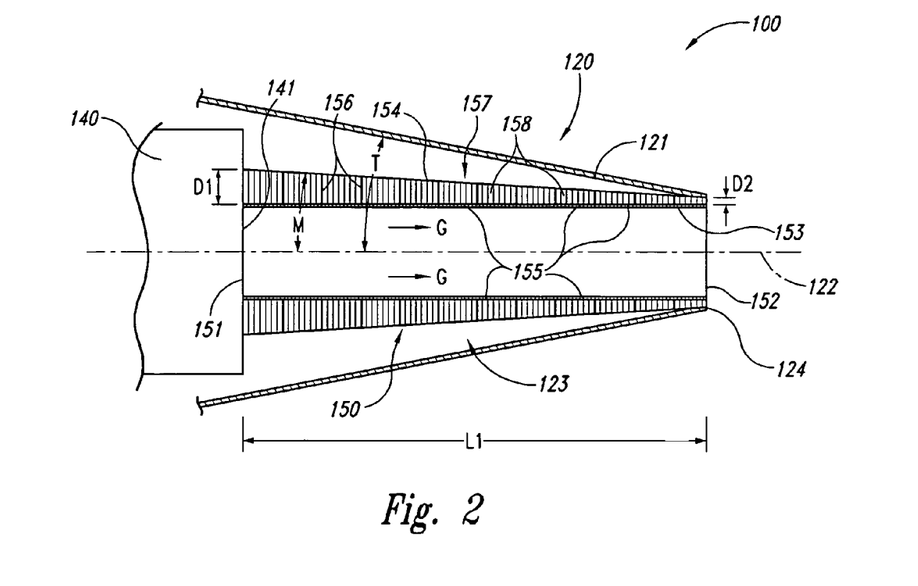
FIG. 2 is a partially schematic, cross-sectional illustration of a tailcone that houses an APU and an associated muffler in accordance with an embodiment of the invention.

FIG. 2 is a partially schematic, cross-sectional illustration of an embodiment of a portion of the tailcone 120 described above with reference to FIG. 1. The tailcone 120 can include an external surface 121 disposed around a cavity 123. Optionally, both the external surface 121 and the cavity 123 can be axisymmetric with respect to an aircraft longitudinal line 122. The cavity 123 can include a cavity opening 124 at or proximate to an aft edge of the tailcone 120. The tailcone 120 can have a shape that tapers inwardly toward the longitudinal line 122 in an aft direction to provide a smooth, gradual closeout of the overall shape of the aircraft 100. In a particular embodiment, the external surface 121 of the tailcone 120 can taper by an angle T relative to the longitudinal line 122.

The APU 140 can be housed in the cavity 123 of the tailcone 120. The APU 140 can include an APU gas exit 141 through which combustion products from the APU 140 pass. The muffler 150 is positioned between the APU gas exit 141 and the cavity opening 124 to attenuate the noise produced by the APU and by the high temperature, high velocity combustion products exhausted by the APU 140.

The muffler 150 can include a tapered outer surface 154 disposed inwardly from the external surface 121 of the tailcone 120, and an inner surface 153 disposed inwardly from the outer surface 154. In one aspect of this embodiment, the external surface 121 of the tailcone 120, as well as the outer surface 154 and the inner surface 153 of the muffler 150 can all be concentric about the longitudinal line 122. In other embodiments, one or more of these components can be eccentric relative to the longitudinal line 122. In any of these embodiments, exhaust products from the APU 140 pass axially through the muffler 150 as indicated by arrows G.

The muffler 150 can further include a core 157 (e.g., an acoustic core) positioned between the inner surface 153 and the outer surface 154. The core 157 can include a multitude of cells 158 having cell walls arranged generally normal to the inner surface 153 and, therefore, the exhaust gas path G. The inner surface 153 can include a multitude of perforations 155 or other openings that allow fluid communication between the gas path G and the cells 158. The cells 158 can accordingly dampen and/or attenuate noise associated with the APU 120 by providing sound-absorbing resonance chambers. The cells 158 can also provide structural support to maintain the relative positions of the inner surface 153 and the outer surface 154. Baffles 156 positioned between sections of the core 157 can provide additional structural support, and can allow sections of the core 157 to be installed or removed without requiring installation or removal of the entire core 157. The inner surface 153 can include a perforated sheet (e.g., a laser drilled sheet) or other porous materials (e.g., Feltmetal®, available from the Technetics Corporation of Deland, Fla.). The porosity, hole size, hole pattern, percentage of open area and thickness of the inner surface 153 can all be selected to provide the desired sound attenuation structural characteristics and gas flow path characteristics.

One feature of the core 157 and the cells 158 is that they can have different depths at different locations along the length L1 of the muffler 150. For example, cells 158 positioned toward the entrance aperture 151 of the muffler 150 can have a depth D1, and cells 158 positioned toward the exit aperture 152 can have a (smaller) depth D2. Accordingly, the outer surface 154 of the muffler 150 has a taper angle M relative to the longitudinal line 122. The taper angle M can have the same sense as the tailcone taper angle T (e.g., both the outer surface 154 of the muffler 150 and the external surface 121 of the tailcone 120 can taper inwardly toward the longitudinal line 122). In a particular embodiment, the tailcone taper angle T can have a value of from about 10° to about 20°, and the muffler taper angle M can have a value of from about 4° to about 10°. In a further particular embodiment, T can have a value of about 15° and M can have a value of about 4°. Because the muffler 150 and the tailcone 120 taper in the same direction, the overall length L1 of the muffler 150 can be less than the overall length of a corresponding muffler having all acoustic cells configured with a single depth D1. For example, the overall length L1 can have a value of about 9 feet in one embodiment. Furthermore, as described in greater detail below with reference to FIG. 6, the noise attenuation at any given frequency may be less using the approach shown in FIG. 2 than the attenuation available with mufflers having cells of a single depth, but the overall noise attenuation over a range of frequencies can be the same as or greater than that of mufflers having cells with a single depth distributed over a length greater than L1.

The cells 158 can have a variety of sizes, shapes and arrangements depending, for example, on the particular characteristics of the tailcone 120 and the APU 140. For example, the cells 158 can be oriented generally normal to the gas flow path G, or canted at an acute angle relative to the gas flow path G. Cells 158 oriented normal to the gas flow path G can provide a more efficient structural arrangement, and cells 158 oriented at an acute angle can provide increased cell depth. The cells 158 can range from a depth D1 of about 4.5 inches (±1.0 inch) to a depth D2 of about 1.5 inches (±1.0 inch). The cells 158 can have a hexagonal or other cross-sectional shape, with a width of about 0.30 inches. Suitable cells 158 are available from Hexcel Corporation of Stamford, Conn. The baffles 156 (placed between groups of cells 158) can be spaced apart by about 5.5 inches in one embodiment, and by other values in other embodiments.

Another feature of an embodiment of the muffler 150 described above is that the outer surface 154 of the muffler 150 can be offset inwardly from the external surface 121 of the tailcone 120. An advantage of this arrangement is that the tailcone 120 need not be made from materials that withstand the high temperatures associated with the combustion products exiting the APU 140. Accordingly, the costs associated with manufacturing the external surface 121 of the tailcone 120 can be reduced when compared with tailcones designed to withstand higher internal temperatures.

Figure 3:
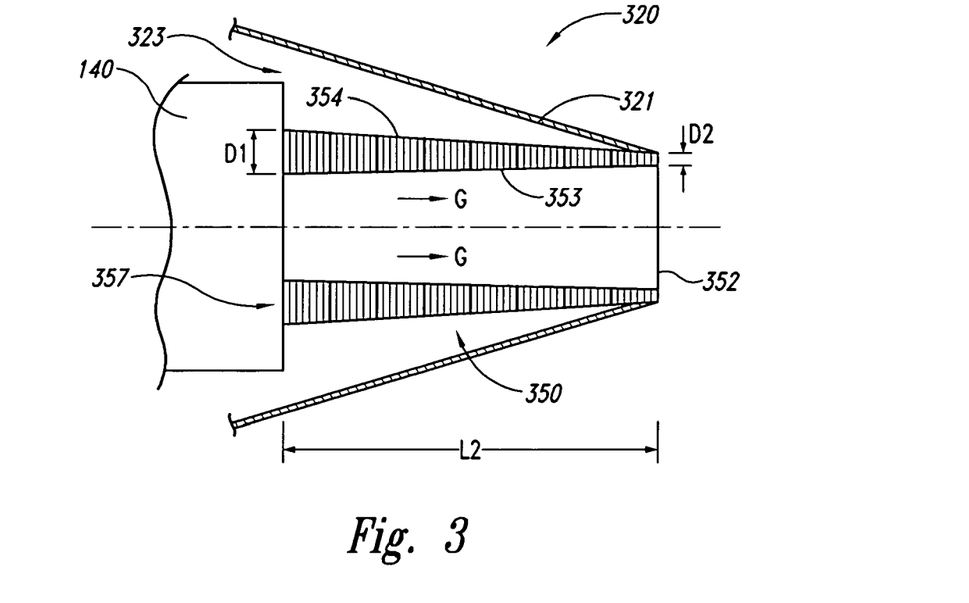
FIG. 3 is a partially schematic, cross-sectional illustration of a tailcone having a tapered muffler in accordance with another embodiment of the invention.

FIG. 3 is a partially schematic, cross-sectional illustration of a tailcone 320 housing a muffler 350 in accordance with another embodiment of the invention. In one aspect of this embodiment, the tailcone 320 includes a tapered external surface 321 disposed around a correspondingly tapered cavity 323. The muffler 350 can have a tapered outer surface 354, a tapered inner surface 353, and a core 357 positioned between the inner surface 353 and the outer surface 354. Because both the outer surface 354 and the inner surface 353 are tapered, the muffler 350 can house cells ranging from depth D1 to depth D2 over a length L2 that may be similar to, or less than the length L1 described above with reference to FIG. 2. In one aspect of this embodiment, this arrangement can further reduce the overall length of the tailcone 320, while providing sufficient attenuation of the noise produced by the APU 140. This arrangement can be suitable for installations in which a smaller number of cells at each of the depths between the forward depth D1 and the aft depth D2 are nevertheless sufficient to attenuate noise to satisfactory levels. In a further particular aspect of this embodiment, the inner surface 353 is tapered in a manner that does not adversely affect the fluid mechanics of the exhaust gas products passing through the muffler 350. The inner surface 353 can also be tapered to form an exit aperture 352 that is not so large as to increase the base drag of the aircraft by more than an acceptable amount.

Figure 4:
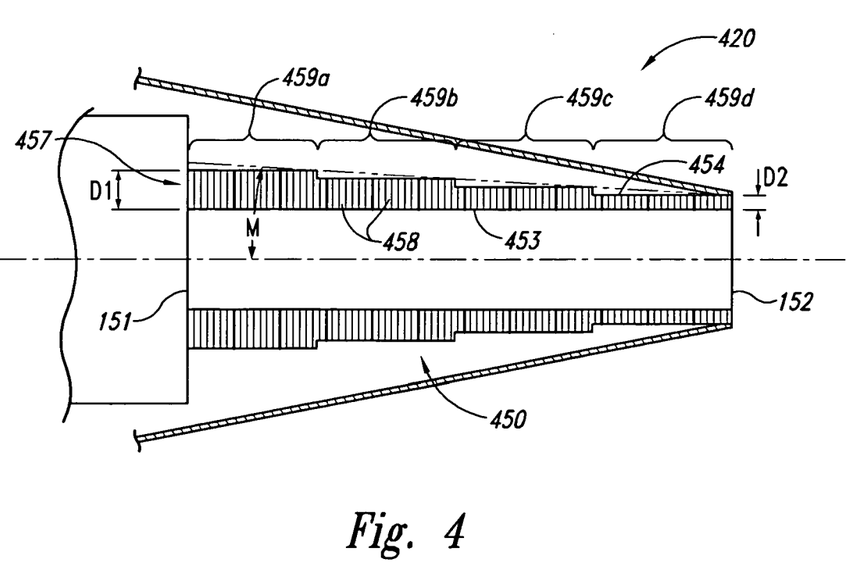
FIG. 4 is a partially schematic, cross-sectional illustration of a tailcone having a muffler with stepped acoustic core depths in accordance with another embodiment of the invention.

FIG. 4 is a partially schematic, cross-sectional illustration of a tailcone 420 housing a muffler 450 configured in accordance with still another embodiment of the invention. In one aspect of this embodiment, the muffler 450 can have a muffler taper angle M generally similar to that described above with reference to FIG. 2. An inner surface 453 of the muffler 450 can also have a shape generally similar to the inner surface 153 described above with reference to FIG. 2. An outer surface 454 of the muffler 450 is offset from the inner surface 453 so as to sandwich a core 457 having a plurality of segments 459 (four segments are illustrated in FIG. 4 as segments 459a-459d). Each segment 459 has cells 458 with a constant depth. Accordingly, cells 458 positioned at segment 459a (toward the entrance aperture 151) have a depth D1, cells 458 positioned at segment 459d (toward the exit aperture 152) have a depth D2, and cells positioned in segments 459b and 459c have intermediate depths between D1 and D2. As a result, the muffler 450 includes groups of cells 458 having identical depths. This arrangement may be easier in some instances to manufacture, install, and/or replace than is a continuously tapered core.

Figure 5:
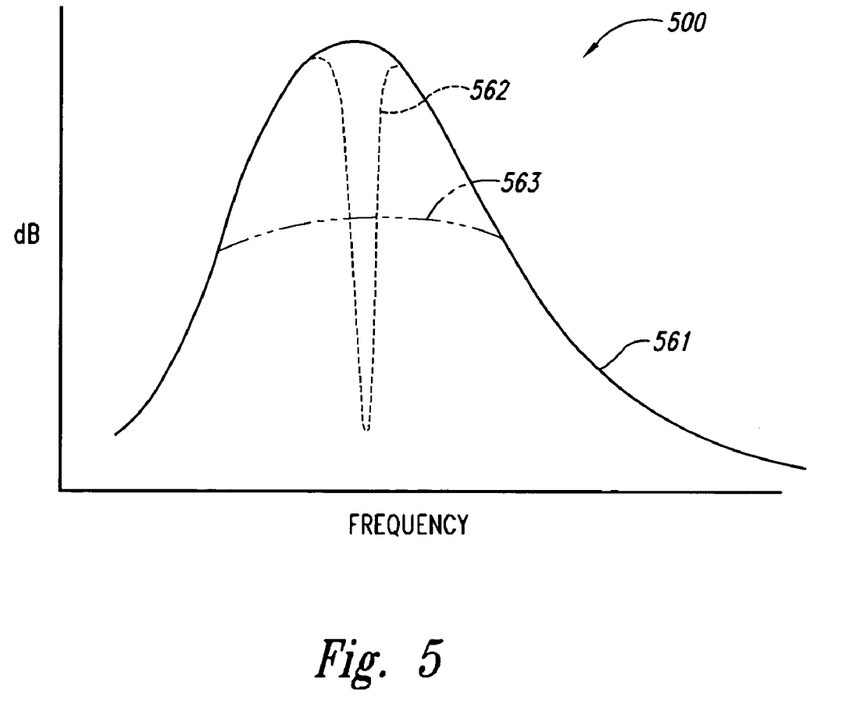
FIG. 5 is a graph illustrating predicted noise attenuation characteristics of mufflers configured in accordance with aspects of the invention.

FIG. 5 illustrates a graph 500 depicting APU noise levels as a function of acoustic frequency. Line 561 illustrates the noise characteristics associated with an unmuffled APU. Line 562 illustrates the noise attenuation associated with an existing muffler having acoustic cells of a constant depth. As shown in FIG. 5, this arrangement can provide significant sound attenuation over a relatively narrow band of frequencies. Line 563 indicates the expected attenuation provided by mufflers having cells with depths that vary in an axial direction, in a manner generally similar to that described above with reference to FIGS. 2-4. As shown in FIG. 5, the frequency range over which sound attenuation occurs is significantly increased (compared to existing arrangements), at the expense of not providing as great a level of attenuation at any one frequency. Nevertheless, the overall attenuation provided by the arrangement depicted by line 563 (commonly referred to in the industry as "roll up") can be significantly improved over existing arrangements. At the same time, as described above, the tapered shape of the corresponding muffler can be more easily integrated into the tapered tailcone than can an existing, constant diameter muffler because the tapered muffler takes advantage of the space available within a similarly shaped tailcone.

Figure 6:
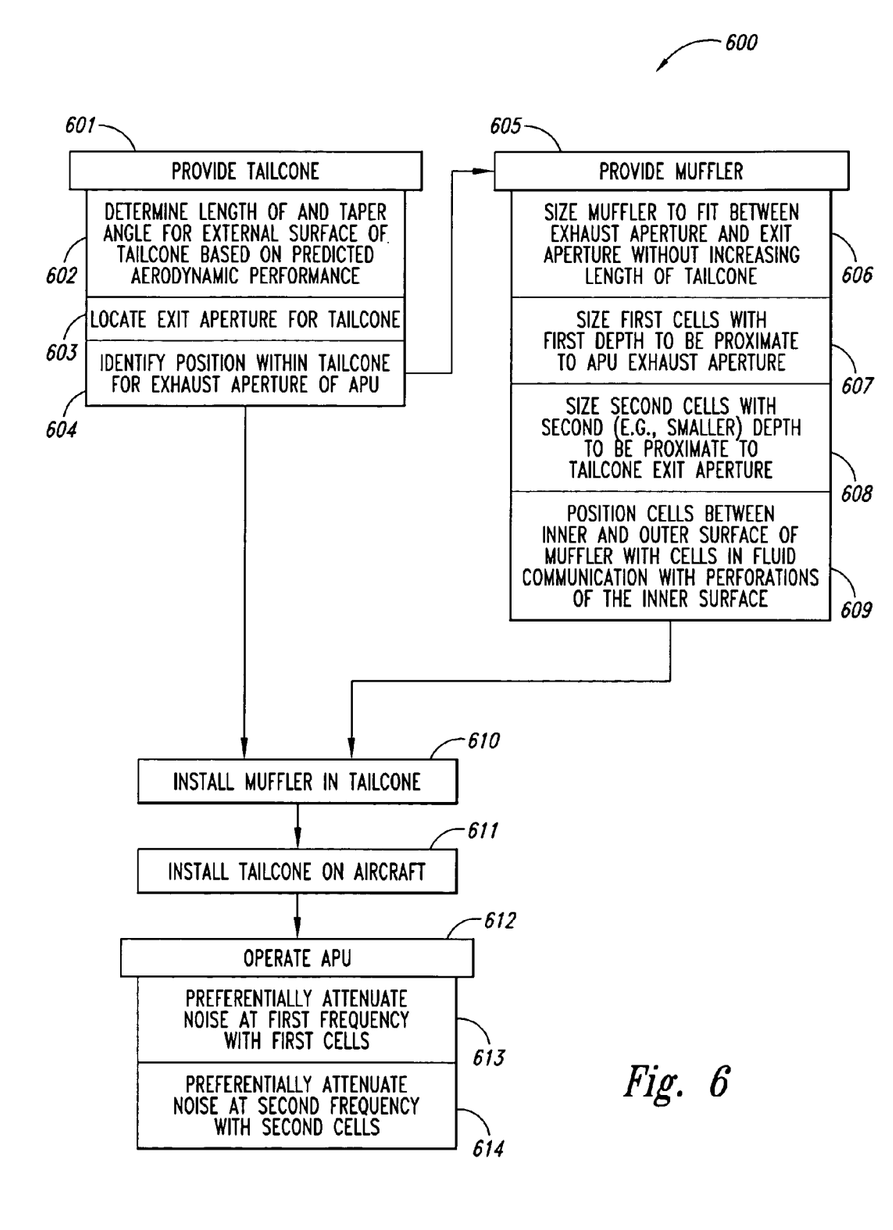
FIG. 6 is a flow diagram illustrating aspects of methods for sizing, manufacturing and using a muffler in accordance with further aspects of the invention.

FIG. 6 is a flow diagram illustrating methods for sizing, manufacturing, and using mufflers and tailcones in accordance with embodiments of the invention. For purposes of illustration, many aspects of these methods are shown in a single FIGURE, though it will be understood by those of ordinary skill in the art that certain aspects can be performed independently of others, and/or by separate entities. The method 600 can include providing a tailcone (process portion 601), providing a muffler (process portion 605), installing the muffler in the tailcone (process portion 610) and installing the tailcone on an aircraft (process portion 611). Process portion 612 includes operating the APU. Some or all of the foregoing process portions can include subprocesses, as described below.

In a particular embodiment, the process of providing a tailcone (process portion 601) can include determining a length of, and taper angle for, an external surface of a tailcone, based on predicted aerodynamic performance (process portion 602). In process portion 603, an exit aperture for the tailcone is located, and in process portion 604, a position within the tailcone for the exhaust aperture of an APU is identified. Accordingly, the process up to this point is focused primarily on sizing the tailcone to provide the desired external aerodynamic performance characteristics.

Providing the muffler (process portion 605) can include sizing the muffler to fit between the exhaust aperture of the APU and the exit aperture of the tailcone without increasing the length of the tailcone relative to the length determined in process portion 602 (process portion 606). Accordingly, the size of the muffler can have little or no impact on the size of the tailcone, and can accordingly have little or no impact on the aerodynamic performance of the external surface of the tailcone. In process portion 607, first cells having a first depth are sized to be proximate to the exhaust aperture of the APU, and in process portion 608, second cells with a second (e.g., smaller) depth are sized to be proximate to the exit aperture of the tailcone. In process portion 609, the cells can be positioned between an inner and outer surface of the muffler, with the cells positioned in fluid communication with perforations at the inner surface of the muffler. The muffler is then installed in the tailcone (process portion 610) and the tailcone is installed on the aircraft (process portion 611).

The process of operating the APU (process portion 612) can include preferentially attenuating noise at a first frequency with the first cells (process portion 613). In process portion 614, noise at a second frequency is preferentially attenuated with the second cells. As a result, and as described above with reference to FIG. 5, the overall level of noise produced by the APU can be reduced compared with existing muffler arrangements by attenuating noise over a wider range of frequencies. Because the external surface of the muffler can taper in generally the same direction as the tailcone, the muffler can be more easily integrated into the tailcone than can existing mufflers.

From the foregoing, it will be appreciated that specific embodiments of the invention have been described herein for purposes of illustration, but that various modifications may be made without deviating from the spirit and scope of the invention. For example, aspects of the invention described in the context of particular embodiments can be combined or eliminated in other embodiments. Accordingly, the invention is not limited except as by the appended claims.

We claim:

1. An aircraft assembly, comprising:
   a tailcone having a tapering external surface disposed around a cavity;
   an engine muffler disposed in the cavity and including:
      a tapering outer surface disposed inwardly from the external surface of the tailcone;
      a porous inner surface disposed inwardly from the outer surface, the inner surface being positioned adjacent to an exhaust gas flow path having an entrance aperture configured to be coupled to an engine and an exit aperture positioned at least proximate to the opening of the cavity; and
      a plurality of cells disposed between the outer surface and the inner surface and in fluid communication with openings of the inner surface, with cells positioned toward the entrance aperture having a first dimension extending away from the exhaust gas path and cells positioned toward the exit aperture having a second dimension extending away from the exhaust gas path, the second dimension being different than the first dimension.

2. The aircraft assembly of claim 1 wherein the second dimension is less than the first dimension.

3. The aircraft assembly of claim 1 wherein the first dimension ranges from about four inches to about five inches.

4. The aircraft assembly of claim 1 wherein the second dimension ranges from about one inch to about two inches.

5. The aircraft assembly of claim 1 wherein the inner surface is generally cylindrical.

6. The aircraft assembly of claim 1 wherein the inner surface tapers outwardly from the entrance aperture to the exit aperture and the outer surface tapers inwardly from the entrance aperture to the exit aperture.

7. The aircraft assembly of claim 1, further comprising an engine coupled to the entrance aperture of the muffler.

8. The aircraft assembly of claim 1, further comprising a auxiliary power unit coupled to the entrance aperture of the muffler.

9. The aircraft assembly of claim 1 wherein the outer surface tapers in a generally continuous manner.

10. The aircraft assembly of claim 1 wherein the outer surface tapers over a plurality of discrete steps.

11. The aircraft assembly of claim 1, further comprising:
    a fuselage positioned forward of the tailcone;
    a wing attached to the fuselage; and
    a propulsion system coupled to at least one of the fuselage and the wing.

12. An aircraft assembly, comprising:
    a tailcone having a tapering external surface disposed around a cavity, the cavity having an opening;
    an auxiliary power unit positioned in the cavity;
    an engine muffler disposed in the cavity and including:
       a tapering outer surface disposed inwardly from the external surface of the tailcone;
       a porous inner surface disposed inwardly from the outer surface, the inner surface being positioned adjacent to an exhaust gas flow path having an entrance aperture coupled to the auxiliary power unit and an exit aperture positioned at least proximate to the opening of the cavity; and
       a plurality of cells disposed between the outer surface and the inner surface and in fluid communication with openings of the inner surface, with cells positioned toward the entrance aperture having a first dimension generally normal to the exhaust gas path and cells positioned toward the exit aperture having a second dimension generally normal to the exhaust gas path, the second dimension being less than the first dimension.

13. The aircraft assembly of claim 12 wherein the inner surface is generally cylindrical.

14. The aircraft assembly of claim 12 wherein the inner surface tapers outwardly from the entrance aperture to the exit aperture and the outer surface tapers inwardly from the entrance aperture to the exit aperture.

15. The aircraft assembly of claim 12 wherein the outer surface tapers in a generally continuous manner.

16. The aircraft assembly of claim 12 wherein the outer surface tapers over a plurality of discrete steps.

17. The aircraft assembly of claim 12, further comprising:
    a fuselage positioned forward of the tailcone;
    a wing attached to the fuselage; and
    a propulsion system coupled to at least one of the fuselage and the wing.

18. A method for manufacturing an aircraft system, comprising:
    providing a tailcone having a tapering external surface disposed around a cavity;
    disposing an engine muffler in the cavity, the engine muffler including:
       a tapering outer surface disposed inwardly from the external surface of the tailcone;
       a porous inner surface disposed inwardly from the outer surface, the inner surface being positioned adjacent to an exhaust gas flow path having an entrance aperture configured to be coupled to an engine and an exit aperture positioned at least proximate to the opening of the cavity; and
       a plurality of cells disposed between the outer surface and the inner surface and in fluid communication with openings of the inner surface with cells positioned toward the entrance aperture having a first dimension extending away from the exhaust gas path and cells positioned toward the exit aperture having a second dimension extending away from the exhaust gas path, the second dimension being different than the first dimension.

19. The method of claim 18, further comprising forming the muffler by attaching the cells between the inner surface and the outer surface.

20. The method of claim 18, further comprising forming the muffler by:
    shaping the outer surface to have a tapered shape; and
    attaching the cells between the inner surface and the outer surface.

21. The method of claim 18 wherein disposing the muffler includes disposing the muffler so that the outer surface of the muffler tapers in the same direction as the external surface of the tailcone.

22. The method of claim 18, further comprising:
    disposing an auxiliary power unit in the tailcone; and
    attaching the muffler to the auxiliary power unit.

23. A method for controlling acoustic emanations from an aircraft auxiliary power unit, comprising:
  exhausting combustion products from an aircraft auxiliary power unit into a muffler positioned within a tapered tailcone of the aircraft;
  directing the combustion products through the muffler in an axial direction from an entrance of the muffler to an exit of the muffler;
  passing the combustion products adjacent to a porous inner surface of the muffler located between the entrance and the exit of the muffler, the porous inner surface providing fluid communication with cells positioned between the inner surface and a tapered outer surface of the muffler, the outer surface being positioned within the tailcone, wherein first cells toward the entrance have a first dimension generally normal to the inner surface and second cells toward the exit have a second dimension generally normal to the inner surface, the second dimension being different than the first dimension; and
  suppressing an acoustic signal provided by the combustion products by attenuating signals at a first frequency more than at a second frequency with the first cells and attenuating signals at the second frequency more than the first frequency with the second cells.

24. The method of claim 23 wherein the first dimension is larger than the second dimension and wherein attenuating signals at a first frequency includes attenuating signals at a first frequency that is lower than the second frequency.

25. The method of claim 23 wherein passing the combustion products adjacent to a perforated inner surface includes passing combustion products along a right circular cylindrical inner surface.

26. The method of claim 23 wherein passing the combustion products adjacent to a perforated inner surface includes passing combustion products along a conical inner surface.

* * * * *